(12) United States Patent
Stoffer et al.

(10) Patent No.: US 9,520,052 B2
(45) Date of Patent: Dec. 13, 2016

(54) SECURITY TAG SYSTEM WITH IMPROVED RANGE CONSISTENCY

(71) Applicant: Innovative Control Systems, Inc., Franklin, WI (US)

(72) Inventors: James F. Stoffer, Delafield, WI (US); Mark Kiekhefer, Waukesha, WI (US); Chris Hielsberg, Watertown, WI (US); Jason Guerrero, Milwaukee, WI (US)

(73) Assignee: Innovative Control Systems, Inc., Franklin, WI (US)

( * ) Notice: Subject to any disclaimer, the term of this patent is extended or adjusted under 35 U.S.C. 154(b) by 86 days.

(21) Appl. No.: 14/687,299

(22) Filed: Apr. 15, 2015

(65) Prior Publication Data

US 2016/0307437 A1    Oct. 20, 2016

(51) Int. Cl.
*H04Q 5/22* (2006.01)
*G08B 25/10* (2006.01)
*G06K 7/10* (2006.01)

(52) U.S. Cl.
CPC ........... *G08B 25/10* (2013.01); *G06K 7/10366* (2013.01)

(58) Field of Classification Search
CPC ..... H04B 7/1555; H04B 7/084; H04B 7/0894; G06K 7/10356
USPC ......................................... 342/157, 380–384
See application file for complete search history.

(56) References Cited

U.S. PATENT DOCUMENTS

| | | | | |
|---|---|---|---|---|
| 2,153,209 A | * | 4/1939 | Scharlau | 342/361 |
| 2,408,119 A | * | 9/1946 | Wirkler | G01S 1/02 342/369 |
| 4,075,566 A | * | 2/1978 | D'Arcangelis | H04B 1/126 455/276.1 |
| 4,464,662 A | * | 8/1984 | Tomasi | G01S 13/48 342/125 |
| 5,661,489 A | * | 8/1997 | Baker | H01Q 3/24 333/81 R |
| 6,016,108 A | * | 1/2000 | Terk | H01Q 9/145 340/12.17 |
| 6,084,513 A | | 7/2000 | Stoffer | |
| 6,239,753 B1 | * | 5/2001 | Kado | G08C 17/04 343/702 |
| 6,369,603 B1 | * | 4/2002 | Johnston | G01R 31/2656 257/E21.531 |
| 6,914,558 B1 | * | 7/2005 | Shirosaka | H01Q 3/22 342/371 |
| 7,042,413 B2 | * | 5/2006 | Mazoki | G06K 19/07786 343/795 |
| 7,049,933 B1 | * | 5/2006 | Koerner | G06K 7/0008 340/10.1 |
| 7,132,944 B1 | | 11/2006 | Kron et al. | |
| 7,742,533 B2 | * | 6/2010 | Aoki | H04B 7/10 375/260 |

(Continued)

*Primary Examiner* — Hai Phan
*Assistant Examiner* — Son M Tang
(74) *Attorney, Agent, or Firm* — Boyle Fredrickson, S.C.

(57) ABSTRACT

A radio transmitter used to transmit an activation signal for radio tags held by individuals or the like provides multi-dimensional polarization to an activation signal so as to allow more consistent range detection of an individual with a tag having a single axis of sensitivity. Circular or spherical polarization can be obtained using the system which may include an antenna design permitting decoupling of antennas necessary for the polarization, a quadrature locking system simplifying proper phase control of the necessary signals and a system for tuning the same.

16 Claims, 4 Drawing Sheets

(56) References Cited

U.S. PATENT DOCUMENTS

| | | | | |
|---|---|---|---|---|
| 7,994,916 B2* | 8/2011 | Kron | ............... | G08B 21/0288 235/375 |
| 9,425,505 B2* | 8/2016 | Kong | ............... | H01Q 3/2694 |
| 2005/0288061 A1* | 12/2005 | Lamothe | ............... | H04B 7/0874 455/562.1 |
| 2007/0020969 A1* | 1/2007 | Yungers | ............... | G06K 7/10336 439/77 |
| 2007/0080810 A1* | 4/2007 | Juds | ............... | G08B 13/24 340/572.8 |
| 2007/0222608 A1* | 9/2007 | Maniwa | ............... | G06K 7/10316 340/572.7 |
| 2007/0225033 A1* | 9/2007 | Yoon | ............... | H01Q 1/2216 455/552.1 |
| 2009/0015409 A1* | 1/2009 | Cheung | ............... | G06K 7/10346 340/572.1 |
| 2009/0315792 A1* | 12/2009 | Miyashita | ............... | H01Q 1/243 343/742 |
| 2010/0079245 A1* | 4/2010 | Perng | ............... | G06K 7/10346 340/10.1 |
| 2010/0171567 A1* | 7/2010 | Krishnaswamy | ............... | H01P 1/185 333/164 |
| 2012/0157006 A1* | 6/2012 | Hong | ............... | H01Q 1/2225 455/67.14 |
| 2013/0095875 A1* | 4/2013 | Reuven | ............... | H04B 7/10 455/509 |
| 2013/0244594 A1* | 9/2013 | Alrabadi | ............... | H04B 7/0413 455/78 |
| 2013/0307752 A1* | 11/2013 | Johansson | ............... | H01Q 1/246 343/893 |
| 2015/0261983 A1* | 9/2015 | Ruotsalainen | ............... | H04B 5/0062 235/439 |
| 2015/0269400 A1* | 9/2015 | Poussot | ............... | G06K 7/10356 340/10.1 |
| 2016/0036509 A1* | 2/2016 | Kanai | ............... | H04B 7/0613 370/329 |

* cited by examiner

FIG. 7

SECURITY TAG SYSTEM WITH IMPROVED RANGE CONSISTENCY

STATEMENT REGARDING FEDERALLY SPONSORED RESEARCH OR DEVELOPMENT

Not Applicable

CROSS REFERENCE TO RELATED APPLICATION

Not Applicable

BACKGROUND OF THE INVENTION

The present invention relates to security systems, for example, for tracking patients in a hospital or medical care facility, and in particular to a security system providing improved range discrimination when wirelessly interrogating patient-held transponders.

Security systems may be used m institutions such as hospital for monitoring patients, for example in pediatrics to deter infant abductions, and in nursing homes or neurological centers to reduce the likelihood of an Alzheimer's or head trauma patient wandering out of the facility.

Wireless security systems equip each patient with a small, wearable transponder (transmitter and receiver). The transponder monitors a selected frequency to detect an activation signal and is activated when an activation signal on the selected frequency is detected at a predetermined threshold amplitude. The activation signal originates from a control unit with an antenna typically located near a door or other exit. In this way, as the patient approaches the door exit, the amplitude of the received activation signal rises until the transponder is activated.

Upon activation, the transponder transmits an identification signal to a receiver connected to the control unit and a control unit decodes the identification signal to lock or unlock the door.

One disadvantage to such a wireless system is that it can be hard to localize the wireless identification signal to a particular door. One reason for this difficulty is that the receiving antenna on the patient transponder may have a variety of different orientations which significantly change its sensitivity as it varies from the orientation of the activation signal. As a result of this variation in practical sensitivity, the activation signal needs to be set to a power level that ensures activation of the patient transponder even with the worst-case transponder antenna orientation. As a result, the activation signal can activate some transponders at a substantial distance from the door including, for example, in rooms or corridors so far removed from the door so as not to warrant activation of the control unit. The difficulty of precise localization of a region of activation can limit the use of such security systems in many important applications where such false triggering cannot be tolerated.

SUMMARY OF THE INVENTION

The present invention provides a control unit that produces an activation signal having circular or spherical polarization. This polarization provides rapid and uniform activation of simple single-axis transponders in a variety of orientations allowing the region of activation to be more precisely defined. The ability to provide accurate circular or spherical polarization is facilitated by a quadrature lock circuit which provides the desired phase relationship between antenna driving signals regardless of antenna mistuning or changes in temperature or mounting location and at a variety of frequencies to produce the desired circular polarization. In addition, one embodiment of the invention provides an antenna design and adjustment method that permits precise decoupling of the antennas necessary for the polarization process. Specifically, in one embodiment, the present invention provides a control unit for a wirelessly activated security tag. The control unit has a first and second antenna having mutually perpendicular transmission axes, a first radiofrequency amplifier communicating with the first antenna to provide a first activation signal at a first center frequency; and a second radiofrequency amplifier communicating with the second antenna to provide a second activation signal at the first center frequency and having a 90 degrees phase shift with respect to the first activation signal. A radiofrequency receiver in the control unit receives an identification signal from a security tag activated by one of the first and second activation signals to provide an output control signal.

It is thus a feature of at least one embodiment of the invention to provide more consistent range sensitivity for wireless security systems through multidimensional polarization of an activation signal used for activating security tags. A benefit of spherical polarization is that it provides field uniformity such that a tag held in any orientation will be detected within a defined area. This allows, for example, that the strength of the activation field may be reduced to cover a small area around a door without bleeding activation signal into nearby patient rooms.

The control unit may include a lockable pivot supporting the first antenna to allow it to pivot about an axis perpendicular to the first and a second axes when unlocked and to be retained against pivoting in a locked state.

It is thus a feature of at least one embodiment of the invention to provide an antenna design that facilitates multidimensional polarization by reducing cross-coupling between antennas oriented along the different dimensions.

The control unit may also include a visual indicator circuit discriminating among variations in electrical energy induced in the first antenna from the second antenna.

It is thus a feature of at least one embodiment of the invention to provide a method of field adjustment of the antennas for minimizing cross coupling; thus achieving "null" positioning.

The visual indicator circuit may also discriminate among variations in electrical energy induced in the first antenna from the first radiofrequency amplifier or the second antenna from the second radiofrequency amplifier.

The first and second antennas may be wound antennas or solenoids providing windings about respective transmission axes.

It is thus a feature of at least one embodiment of the invention to provide a multidimensional polarization using simple solenoid-type antenna designs in combination.

The control unit may include a radiofrequency oscillator communicating with the first and second radiofrequency amplifiers and further including a phase comparator comparing phases of signals of the first and second antennas to detect a deviation from a 90 degrees phase relationship and to dynamically adjust the phase of at least one signal from the radiofrequency oscillator to the first and second radiofrequency amplifier to hold a phase of the signals of the first and second antennas at a phase difference of 90 degrees.

It is thus a feature of at least one embodiment of the invention to provide feedback control of the phase between the signals from the first and second antenna to maintain "quadrature" phasing for improved uniformity in the circular polarization plane.

The radiofrequency oscillator may communicate with the first and second radiofrequency amplifier through a first and second phase shift adjuster and the phase comparator may communicate with the first and second phase shift adjuster to provide for the adjustment of either of the phases of the signals of the first and second antennas.

It is thus a feature of at least one embodiment of the invention to permit bidirectional phase adjustment using unidirectional phase adjusters.

The control unit may also include a third antenna orthogonal to the first and second antennas and a third radiofrequency amplifier communicating with the third antenna to provide a third activation signal deviating from the first center frequency to provide a varying phase shift with respect to the first and second activation signals.

It is thus a feature of at least one embodiment of the invention to provide a "spherical" polarization for improved reception uniformity beyond that provided by circular polarization.

The third activation signal may be frequency modulated at a modulating frequency at least 100 times less than the first center frequency.

It is thus a feature of at least one embodiment of the invention to permit spherical polarization which has the effectiveness of generating a field as though produced by an isotropic radiator; without substantial distortion of the activation signal's perimeter as received by the security tag.

The antenna may further include a lockable pivot supporting the third antenna to allow it to pivot about a first pivot axis parallel with the first transmission axis and a second pivot axis parallel to the second transmission axes.

It is thus a feature of at least one embodiment of the invention to provide an antenna that allows tuning of the spatial orthogonality of each of three antennas for minimized antenna coupling.

The third antenna may be implemented as copy traces on a printed circuit board having multiple layers producing a set of windings about an axis perpendicular to a broad face of the printed circuit board.

It is thus a feature of at least one embodiment of the invention to provide a simplified third antenna design that may be easily integated with wound core material of the first and second antennas.

The control unit may also include a visual indicator indicating electrical energy induced in the third antenna from at least one of the first and second antennas.

It is thus a feature of at least one embodiment of the invention to permit field positional "nulling" of the third antenna for minimize coupling with the first and second antennas.

The visual indicator circuit may further discriminate among variations in electrical energy induced in the third antenna from the third radiofrequency amplifier for tuning purposes.

It is thus a feature of at least one embodiment of the invention to permit spatial and frequency tuning of the third antenna.

The control unit may further include a radiofrequency oscillator communicating with the third radiofrequency amplifier and further including a phase lock loop providing a phase comparator and a voltage controlled oscillator, the latter providing an output to the third radiofrequency amplifier frequency locked to the radiofrequency oscillator.

It is thus a feature of at least one embodiment of the invention to provide frequency locking between three antennas.

The phase lock loop may include a phase comparator and a voltage controlled oscillator and a summing junction summing a phase modulation signal to the output of the phase comparator.

It is thus a feature of at least one embodiment of the invention to provide a circuit for stably locking signals in phase while allowing circular polarization by slight frequency perturbations.

The control unit may further include a processor for controlling the first, second, and third radiofrequency amplifiers to vary a power output provided by each of the first, second, and third amplifiers to modulate an activation region and to monitor the radiofrequency receiver for receiving an identification signal from the security tag with at least two different power outputs provided, to each of the first, second, and third amplifiers to deduce a range of an activated security tag.

It is thus a feature of at least one embodiment of the invention to exploit the improved range consistency provided by circular or spherical polarization to extract range information about the security tag.

These particular objects and advantages may apply to only some embodiments falling within the claims and thus do not define the scope of the invention.

DETAILED DESCRIPTION OF THE PREFERRED EMBODIMENT

Figure 1:
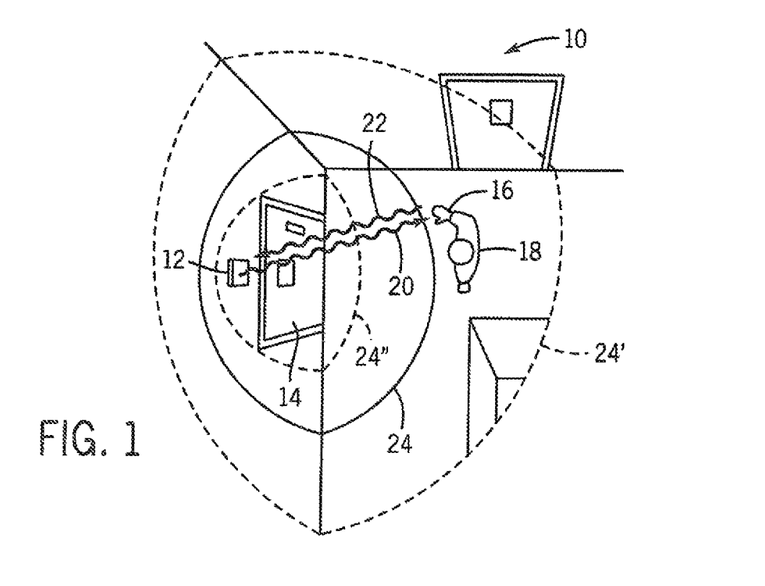
FIG. 1 is a top-down perspective view of a door monitored by a security system of a type that may be implemented by the present invention using at least one transponder tag and a control unit and showing a localized region of activation obtained with spherical polarization in comparison with a range of activation that may occur in prior art unpolarized units.

Referring now to FIG. 1, an access control system 10 for an access region may provide a control unit 12, for example, mounted above a door 14 for detecting a tag 16, for example, on a patient 18 or the like.

Generally, the control unit 12 transmits an activation signal 20 that will activate the tag 16 when that activation signal 20 is detected by the tag 16 at a predetermined threshold amplitude. As is generally understood in the art, tag 16 may include a radio transponder (transceiver) and battery system and may monitor a predetermined frequency for the activation, signal 20 and in response to receiving the activation signal 20 at the predetermined amplitude, may return an identification signal 22 to be received by the control unit 12.

The control unit 12, receiving the identification signal 22, may compare the information of the identification signal to a stored authorization list to provide a control output, for example, locking or unlocking the door 14 through the use of electro-mechanically activated locks such as are well known in the art. Alternatively, an alarm signal may be generated as may be appropriate if the patient 18 is not authorized to be in a particular region.

A system of this type is described in U.S. Pat. No. 6,084,513 issued Jul. 4, 2007, and U.S. Pat. No. 7,132,944 issued Nov. 7, 2006, both assigned to the assignee of the present invention and hereby incorporated by reference.

The location at which the tag 16 is activated by the activation signal 20 defines an activation region 24. In the prior art, the activation region 24 is highly dependent on the orientation of an internal antenna of the tag 16 and can vary between a larger region of activation 24 and a small region of activation 24" whose difference in size can cause unwanted variation in the activation for different patients 18 or a given patient 18 at different times. Simple and low-cost implementations of the tag 16 include an antenna having a reception sensitivity that is dominant along a single axis.

In order to provide certainty in protecting a given door 14, the smallest activation region 24" must be made large enough to fully encompass the door 14 such as can result in the largest activation region 24' straying into unwanted zones, for example, through walls and into rooms outside of a given corridor. As will be discussed in greater detail below, the present invention provides a circular or spherical polarization to the activation signal 20 that provides substantially more uniformity in the activation region 24 because the internal antenna of the tag 16 will be aligned with the orientation of the activation signal 20 at some point during the circular or spherical polarization to have a reception that is substantially constant at a given distance regardless of the orientation of the tag 16.

Figure 2:
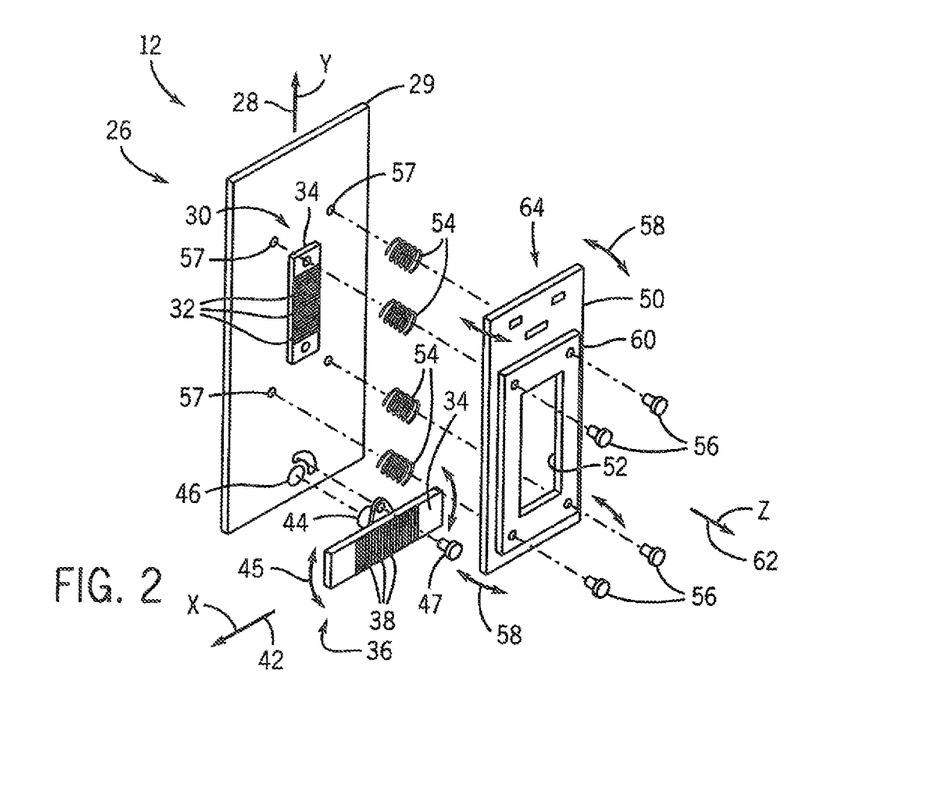
FIG. 2 is an exploded view of an antenna assembly for the control unit of FIG. 1 providing three orthogonal antennas and at adjustment mechanism for nulling the antennas for spherical polarization.
Figure 3:
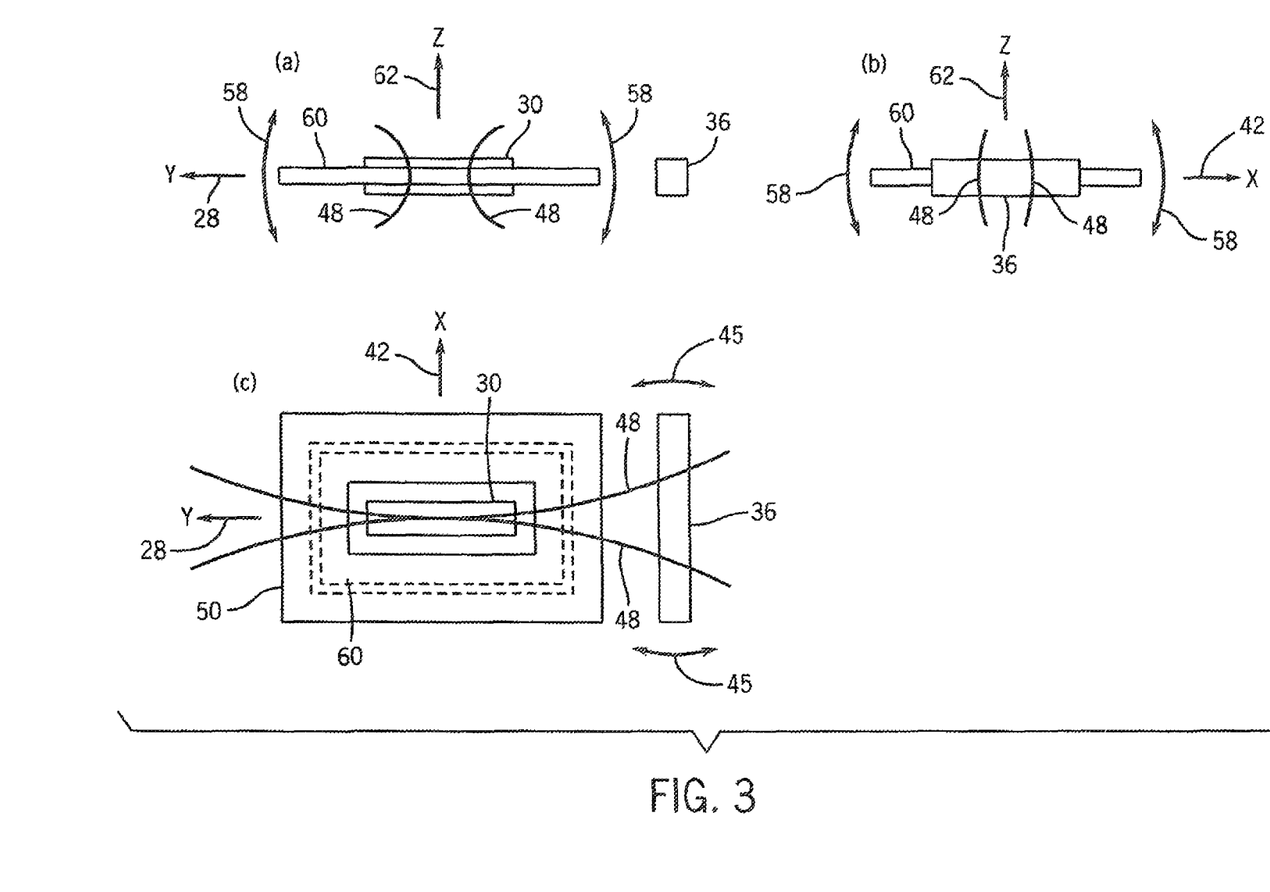
FIG. 3 is an orthogonal view of the assembled antenna system of FIG. 2 along three axes illustrating the nulling process.

Referring now to FIGS. 2 and 3, in the present invention, the control unit 12 may include an antenna system 26 providing a base plate 29 that may be mounted, for example, against the wall above a door to lie in a generally vertical plane extending upward along a y-axis 28. A center of the plate 29 may support a y-axis antenna 30 being generally a solenoid of conductive wire 32 wrapped around a high permittivity core 34 where the axis of the solenoid extends along the y-axis 28. In one embodiment the solenoid may be a ferrite loop stick.

Positioned below the y-axis antenna 30 and coplanar therewith is an x-axis antenna 36 also providing a solenoid of conductive wire 38 wrapped about a high permittivity core 40. In this case, the axis of the solenoid of conductive wire 38 extends parallel to the x-axis 42 (termed a transmission axis) perpendicular to and coplanar with the y-axis 28. The x-axis antenna 36 is mounted on a pivot axle 44 extending into a corresponding socket 46 on the plate 29 allowing the x-axis antenna 36 to rotate about an axis perpendicular to both the x-axis 42 and y-axis 28, as indicated by arrows 45 parallel to the plane of the plate 29.

To align the x-axis antenna 36 with the x-axis 42, a locking screw fastener 47 interfacing between the pivot axle 44 and the plate 29 is loosened to allow moving then re-locks the position of the x-axis antenna 36 once it is properly aligned.

As best seen in FIG. 3(c) when the x-axis antenna 36 is properly aligned parallel with the x-axis 42, it is bisected by the y-axis 28 and as a result is decoupled from the y-axis antenna 30 whose flux lines 48 are generally perpendicular to the axis of the x-axis antenna 36 and symmetric in their deviation about the y-axis 28 so as to induce no current in the x-axis antenna 36. Only these antennas are required if circular polarization is preferred.

A printed circuit board 50 having a center cut-out 52 fitting around the y-axis antenna 30 may be supported against the plate 29 separated therefrom by helical compression springs 54 and retained by four machine screws 56 passing through holes 59 in the corners of the printed circuit board 50 to be received by threaded sockets 57. The machine screws 56 place these helical compression springs 54 into slight compression captivating plate 29 between heads of the machine screws 56 and the helical compression springs 54. Alternatively, it will be appreciated that the screws may be fixed with respect to the plate 29 and one or more threaded nuts or spacers rotated along the screws to provide the necessary adjustment. By changing the relative compression of each of the helical compression springs 54, the printed circuit board 50 may be adjusted in angle with respect to both the y-axis 28 and x-axis 42 as indicated by arrows 58. This adjustment may be such as to bring a normal of the surface of the printed circuit board 50 into alignment with the z-axis 62 being orthogonal to the y-axis 28 and x-axis 42 and for a plane defined by that surface to bisect the x-axis antenna 36 and y-axis antenna 30.

The surface of the printed circuit board 50 may support a helically wound z-axis antenna 60 that is coplanar with the surface formed by multiple layers of traces constructed using standard printed circuit board techniques. As best seen in FIGS. 3(a) and (b), the surface of the printed circuit board 50 is aligned as described above, and flux lines 48 from the z-axis antenna 60 are substantially perpendicular to the extent of the y-axis antenna 30 and x-axis antenna 36 and symmetric to induce no current in those antennas. By similar analysis, it can be seen that each of the y-axis antenna 30, x-axis antenna 36, and z-axis antenna 60 may be decoupled from the others when they are properly adjusted using the pivot axle 44 and the machine screws 56. A tuning aid for this adjustment will be described further below.

Figure 4:
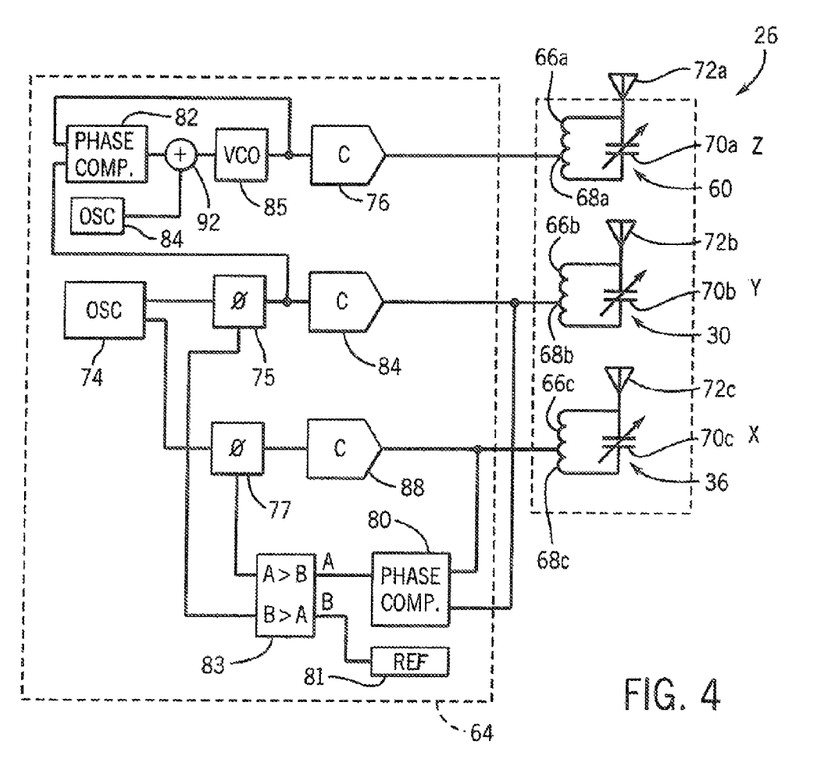
FIG. 4 is a block diagram of radiofrequency amplifiers attached to the antennas of the system of FIGS. 2 and 3 as locked together by means of a primary driving oscillator and two phase locked loops, the latter of which receive a dithering modulation.

Referring now to FIG. 4, the antenna system 26 may communicate with a radiofrequency driver circuit 64 generally providing periodic waveforms to each of the x-axis antenna 36, y-axis antenna 30, and z-axis antenna 60 to create a spherically polarized activation signal 20 produced by providing three separate waveforms.

In this regard, each of y-axis antenna 30, x-axis antenna 36, and z-axis antenna 60 may comprise a tank circuit including inductor 66 shunted by capacitor 70a, and tapped along its length at an input point 68 to act like an auto transformer stepping up the voltage applied at the input point 68. The capacitor 70a provides a parallel resonance of the tank circuit near a desired transmission frequency. It will be understood that the solenoid of the antennas 30, 36, and 60 may also provide double duty as part of the inductor 66 forming the parallel resonance. A radiating portion 72, respectively, may be attached to this tank circuit of each of the antennas 30, 36, or 60. Tuned antennas are advantageous when using Class C amplifiers to drive the antennas, and provide good power efficiency.

A tunable oscillator 74 may be set to a desired frequency for the activation signal 20 to provide an input signal to a voltage controlled phase lag circuit 75 and then to class-C amplifier 76 operating in switching mode to provide a series of pulses to the input point 68 of y-axis antenna 30. The tank circuit smooths these pulses to provide substantially sinusoidal radiated radiofrequency in the range of a few hundred kilohertz.

The tunable oscillator 74 may provide for a second output having a 90 degrees phase lag with respect to the signal provided to the voltage controlled phase lag circuit 75. This second output is provided to voltage controlled phase lag circuit 77 and then to class-C amplifier 84 whose output connects to the input point 68 of the x-axis antenna 36.

The output from the class-C amplifier 76 and the class-C amplifier 84 also may be input to a phase comparator 80 which provides an output voltage that equals a reference voltage 81 when the inputs are perfectly locked to a 90 degrees phase difference, moving positive with respect to the reference voltage 81 when the output of amplifier 84 is more than 90 degrees ahead of the output of amplifier 88 and moving negative with respect to the reference voltage 81 when the output of amplifier 84 is less than 90 degrees ahead of the output of amplifier 88. This output voltages received by a comparator 83 that provides a voltage to voltage controlled phase lag circuit 75 in the former case increasing a phase lag in the output of amplifier 84 and provides a voltage to phase lag circuit 77 in the latter case providing relative phase lag in the output of amplifier 88. The voltage controlled phase lag circuits 75 and 77 may for example switch in a capacitive phase lag network to produce the desired phase lag as is understood in the art.

Optimal circular polarization of the activation field requires maintenance of a 90° phase relationship between two of the antennas 30 and 36. This becomes difficult when driving tuned antennas since a slight mis-tune, or variation of temperature or mounting location, may alter the phase relationship and diminish the effectiveness of circular polarization. The operation of the phase comparator 80 and comparator 83 and voltage controlled phase lag circuit 75 and 77 on the other hand, holds the desired phase relationship despite mis-tuning, variation of temperature, or mounting location.

The above described circuit ensures that the waveform applied to the y-axis antenna 30 and the x-axis antenna 36 will be equal in frequency and that the phase between these frequencies will differ by 90 degrees in a self-correcting "quadrature lock". It will be appreciated that this quadrature lock provides a circularly polarized activation signal that alone will provide for a more consistent activation region 24 in that it will better match with different orientations of the tag 16 in the x-y plane. Spherical polarization is obtained by a frequency lock, phase wobble used with the z-axis antenna 60 as will now be described.

Referring still to FIG. 4, the output of the voltage controlled phase lag circuit 75 for the y-antenna 30 may be provided to the input of the phase comparator 82 that also receives the output of a voltage controlled oscillator 85. The output of the voltage controlled oscillator 85 also provides an input to a class-C amplifier 76 whose output connects to the input point 68 of the z-axis antenna 60. The output of the phase comparator 82 passes through a summing junction 92, which will be discussed below, to the input of a voltage controlled oscillator 85. In this way the phase comparator 82 and voltage controlled oscillator 85 provides a signal to amplifier 76 that is loosely phase locked to the frequency originating from the oscillator 74 via phase comparator 75, but with an arbitrarily changing phase offset that deviates from a truly locked state due to low frequency oscillator 94. This "dither signal" practically randomizes the phase of z relative to x and y.

Figure 5:
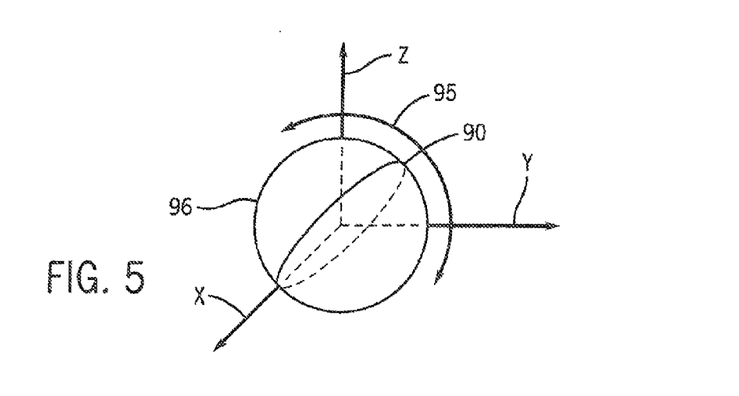
FIG. 5 is a perspective representation of a radiofrequency vector as modulated by the system of the present invention.

Referring also to FIG. 5, if the phase comparator 82 were to provide a 90 degrees phase lag, this locking system would produce a circular polarization within a polarization plane 90 tipped slightly with respect to the x, y, and z axes if the output of the phase comparator 82 were connected directly to the input of the voltage controlled oscillator 85. However, as mentioned, the invention routes the output of the phase comparator 82 through summing junction 92, for example, implemented with an operational amplifier, and sums to that output a low-frequency dither signal produced by dither oscillator 94. Dither oscillator 94 may have an output frequency, for example a sine wave or other continuous wave, on the order of ten hertz.

The sum of these two signals from the summing junction 92 is then provided as the input to the voltage controlled oscillator 85 which provides the output to the class-C amplifier 76. The result (shown in FIG. 5) is that the polarization plane 90 wobbles as indicated by arrow 95 to sweep through a spherical volume 96 at a ten hertz rate or about ten times per second. In this way, the activation signal will align with an arbitrarily angled antenna of the tag 16 ten times per second effectively producing an extremely uniform activation region 24.

It will be appreciated from the above description that although the oscillator 74 is tunable, each of the antennas 72a, 72b, and 72c will operate at substantially the same frequency being driven by the same frequency source.

Figure 6:
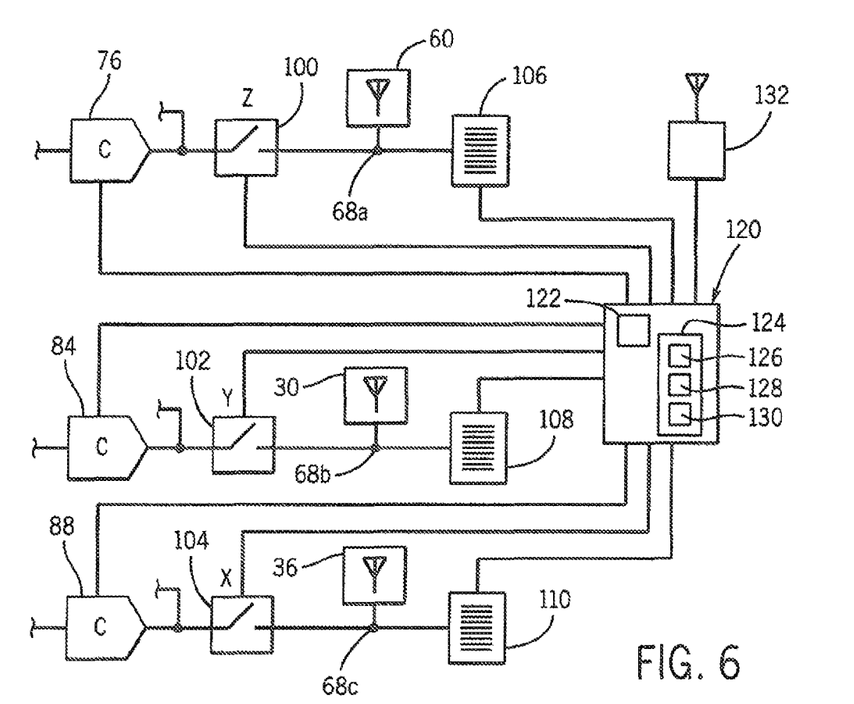
FIG. 6 is a block diagram of a power monitoring system suitable for use with the present invention for tuning and nulling the control unit and antenna and showing a processor such as may control the amplifiers of FIG. 4 for range control.

Referring now to FIG. 6, the output of the amplifiers 76, 84, and 88 may connect to respective antennas 30, 36 and 60 through the switches 100, 102, and 104, respectively, so that the antennas 30, 36 and 60 may be temporarily disconnected from their respective amplifiers 76, 84, and 88 for nulling purposes. Alternatively, because the amplifier 76, 84, and 88 are preferably class-C amplifiers having infinite output impedance when they receive no input signal, the switches 100, 102, and 104 may be placed before the amplifier 76, 84, and 88. The input points 68 of each of the antennas 30, 36 and 60 may also be connected to a voltage display 106, 108, or 110, respectively, so that the voltage at the respective input points 68a, 68b, and 68c can be measured. It will be appreciated that switches 100, 102, and 104 may be conventional mechanical switches, jumpers, shunts, or computer-controlled solid-state switches as desired.

Referring to FIGS. 4 and 6, the tuning process may proceed by first individually dosing a respective one of the switches 100, 102, and 104 (e.g. opening the other switches) and tuning the capacitor 70a, 70b, or 70c to produce the maximum voltage reading on respective displays 106, 108, or 110. Thus, for example, switch 100 is closed while switch 102 and switch 104 are open and capacitor 70a tuned to provide a maximum output reading on display 106. This process is repeated for each capacitor 70a, 70b, and 70c.

After this tuning of antennas 30, 36 and 60 is complete, switch 102 of antenna 30 is closed with switch 100 and 104 open, and fastener 47 (shown in FIG. 2) loosened and x-axis antenna 36 rotated about the pivot axle 44 to produce a slight dip in output voltage on display 108 as a function of that rotation. The x-axis antenna 30 is locked in the position that produces the greatest dip or null. This provides a mechanism of properly aligning x-axis antenna 36 with y-axis antenna 30 to minimize inductive coupling therebetween.

Next switch 104 is closed and switches 102, 100 are opened. At this point the machine screws 56 (shown in FIG.

2) are loosened and tightened to tip the printed circuit board 50 to minimize the reading visible on display 110.

The invention contemplates the inclusion of a processor system 120 having a processor 122 communicating with an electronic memory 124 such as may hold data and a variety of programs including an operating system 126, a security monitoring routine 128, and a tuning routine 130. The processor system 120 may also communicate with a tag interrogation transmitter 132 used for receiving information from a tag 16 after it has been activated by activation signal 20 (shown in FIG. 1) according to methods generally known in the art.

The processor system 120 may also communicate with each of the switches 100, 102. and 104 and the displays 106, 108, and 110, to assist in the tuning procedure described above by cycling the user through the various steps possibly including written or spoken cues. The processor system 120 may also assist in the detection of the dips, for example, by an audible tone or the like when the dip is arrived at.

Figure 7:
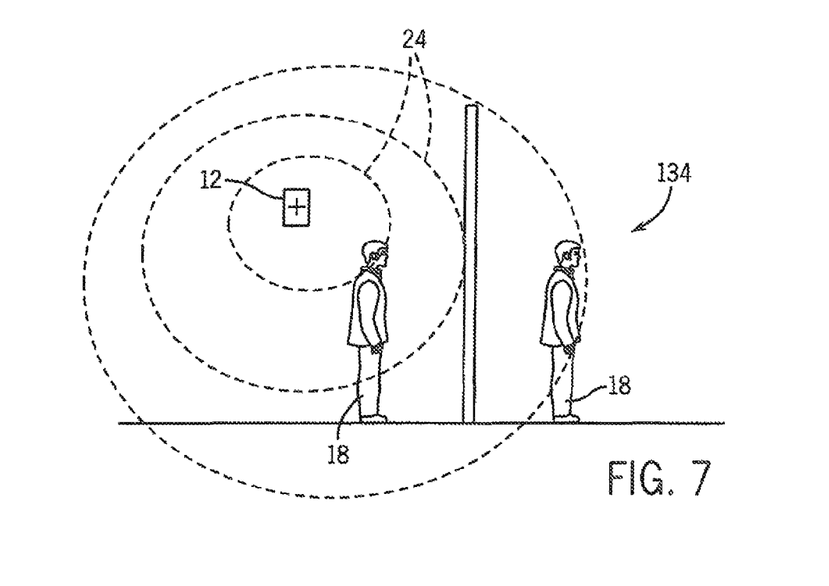
FIG. 7 is a side elevational view of the door of FIG. 1 showing a sweeping of range of the activation region for tag discrimination by range.

The processor system 120 may also communicate with each of the amplifiers 76, 84, and 88 to control their gain. Referring now to FIG. 7, this gain control may be used to change the relative size of the uniform activation region 24 during operation of the system. The improved accuracy obtained with respect to the size of the uniform activation region 24 may then be used to provide a ranging function to determine the distance between a patient 18 and the control unit 12 according to the size of the activation region (controlled by controlling the gain of amplifier 76, 84. and 88) necessary to receive a signal back from a tag on the patient 18. In this way, the present invention enables a ranging function that may provide additional information about the patient 18 which may be used to fence off particular locations, for example, in an adjacent room 134, away from the door 14 to prevent nuisance activations.

Certain terminology is used herein for purposes of reference only, and thus is not intended to be limiting. For example, terms such as "upper", "lower", "above", and "below" refer to directions in the drawings to which reference is made. Terms such as "front.", "back", "rear", "bottom" and "side", describe the orientation of portions of the component within a consistent but arbitrary frame of reference which is made clear by reference to the text and the associated drawings describing the component under discussion. Such terminology may include the words specifically mentioned above, derivatives thereof, and words of similar import. Similarly, the terms "first", "second" and other such numerical terms referring to structures do not imply a sequence or order unless clearly indicated by the context. It will be appreciated that the particular orientation of the x, y, and z axes is arbitrary and invention is not limited to particular orientation of the control unit.

When introducing elements or features of the present disclosure and the exemplary embodiments, the articles "a", "an", "the" and "said" are intended to mean that there are one or more of such elements or features. The terms "comprising", "including" and "having" are intended to be inclusive and mean that there may he additional elements or features other than those specifically noted. It is further to be understood that the method steps, processes, and operations described herein are not to be construed as necessarily requiring their performance in the particular order discussed or illustrated, unless specifically identified as an order of performance. It is also to be understood that additional or alternative steps may be employed.

References to "a microprocessor" and "a processor" or "the microcontroller" can be understood to include one or more processors and similar circuitry such as FPGAs, microprocessors, microcontrollers, etc., that can communicate in a stand-alone and/or a distributed environment(s), and can thus be configured to communicate via wired or wireless communications with other processors, where such one or more processor can be configured to operate on one or more processor-controlled devices that can be similar or different devices. Furthermore, references to memory, unless otherwise specified, can include one or more processor-readable and accessible memory elements and/or components that can be internal to the processor-controlled device, external to the processor-controlled device, and can be accessed via a wired or wireless network.

It is specifically intended that the present invention not be limited to the embodiments and illustrations contained herein and the claims should be understood to include modified forms of those embodiments including portions of the embodiments and combinations of elements of different embodiments as come within the scope of the following claims. All of the publications described herein, including patents and non-patent publications, are hereby incorporated herein by reference in their entireties.

What we claim is:

1. A control unit for a wirelessly activated security tag comprising:
    a first and second antenna having mutually perpendicular first and second transmission axes respectively;
    a first radiofrequency amplifier communicating with the first antenna to provide a first activation signal at a first center frequency;
    a second radiofrequency amplifier communicating with the second antenna to provide a second activation signal at the first center frequency and having a 90 degrees phase shift with respect to the first activation signal; and
    including a third antenna orthogonal to the first and second antennas and a third radiofrequency amplifier communicating with the third antenna to provide a third activation signal deviating from the first center frequency to provide a varying phase shift with respect to the first and second activation signals;
    a radiofrequency receiver for receiving an identification signal from a security tag activated by one of the first, second and third activation signals to provide an output control signal;
    further including a microprocessor for controlling the first, second, and third radiofrequency amplifiers to vary a power output provided by each of the first second, and third amplifiers to modulate an activation region and to monitor the radiofrequency receiver for receiving an identification signal from the security tag from at least two different power outputs provided to each of the first, second, and third amplifiers to deduce a range of an activated security tag.

2. The control unit of claim 1 further including a lockable pivot supporting the first antenna to allow it to pivot about an axis perpendicular to the first and second transmission axes when unlocked and to be retained against pivoting in a locked state.

3. The control unit of claim 1 further including a visual indicator circuit discriminating among variations in electrical energy induced in the first antenna from the second antenna.

4. The control unit of claim 3 wherein the visual indicator circuit further discriminates among variations in electrical energy induced in the first antenna from the first radiofrequency amplifier.

5. The control unit of claim 4 further including an additional visual indicator circuit further discriminating among variations in electrical energy induced in the second antenna from the second radiofrequency amplifier.

6. The control unit of claim 1 wherein the first and second antennas are solenoids providing windings about respective transmission axes.

7. The control unit of claim 1 further including a radiofrequency oscillator communicating with the first and second radiofrequency amplifiers and further including a phase comparator comparing phases of signals of the first and second antennas to detect a deviation from a 90 degrees phase relationship and to dynamically adjust the phase of at least one signal from the radiofrequency oscillator to the first and second radiofrequency amplifier to hold a phase of the signals of the first and second antennas at a phase difference of 90 degrees.

8. The control unit of claim 7 wherein the radiofrequency oscillator communicates with the first and second radiofrequency amplifier through a first and second phase shift adjuster and wherein the phase comparator communicates with the first and second phase shift adjuster to provide for the adjustment of either of the phases of the signals of the first and second antennas.

9. The control unit of claim 1 wherein the third activation signal is frequency modulated at a modulating frequency at least 100 times less than the first center frequency.

10. The control unit of claim 9 further including a lockable pivot supporting the third antenna to allow it to pivot about a first pivot axis parallel with the first transmission axis and a second pivot axis parallel to the second transmission axis.

11. The control unit of claim 10 wherein the third antenna is a printed circuit board having multiple layers implementing a set of windings about an axis perpendicular to a broad face of the printed circuit board.

12. The control unit of claim 1 further including visual indicator indicating electrical energy induced in the third antenna from at least one of the first and second antennas.

13. The control unit of claim 12 wherein the visual indicator circuit further discriminates among variations in electrical energy induced in the third antenna from the third radiofrequency amplifier.

14. The control unit of claim 1 further including a radiofrequency oscillator communicating with the third radiofrequency amplifier and further including a phase lock loop providing a phase comparator and a voltage controlled oscillator, the latter providing an output to the third radiofrequency amplifier frequency loosely locked to the radiofrequency oscillator.

15. The control unit of claim 14 wherein the phase lock loop includes a phase comparator and a voltage controlled oscillator and further includes a summing junction summing a phase modulation signal to the output of the phase comparator.

16. The control unit of claim 15 wherein the phase modulation signal has a frequency of at least 100 times less than the first center frequency.

* * * * *

UNITED STATES PATENT AND TRADEMARK OFFICE
CERTIFICATE OF CORRECTION

PATENT NO. : 9,520,052 B2  
APPLICATION NO. : 14/687299  
DATED : December 13, 2016  
INVENTOR(S) : James F. Stoffer et al.

It is certified that error appears in the above-identified patent and that said Letters Patent is hereby corrected as shown below:

On the Title Page

Item (72) Inventor name spelled incorrectly;

Delete – "Mark Kiekhefer" and substitute therefor -- Mark Kieckhefer --

Signed and Sealed this  
Seventh Day of February, 2017

Michelle K. Lee  
*Director of the United States Patent and Trademark Office*